Dec. 5, 1933.  J. B. MEYER  1,937,708
STOVE PIPE DAMPER
Filed Jan. 14, 1931
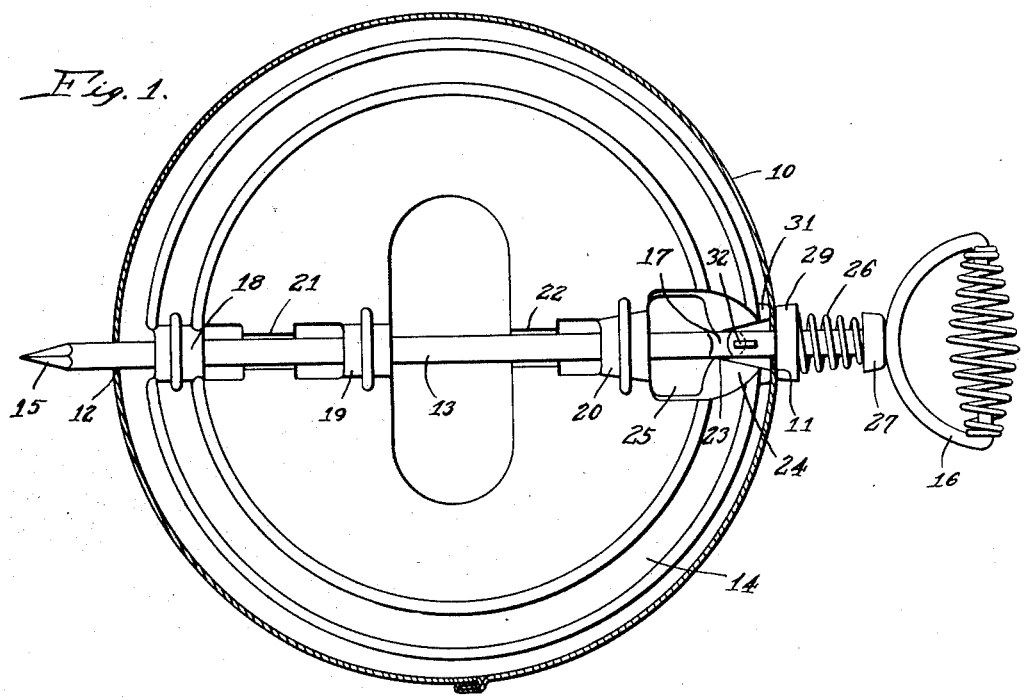
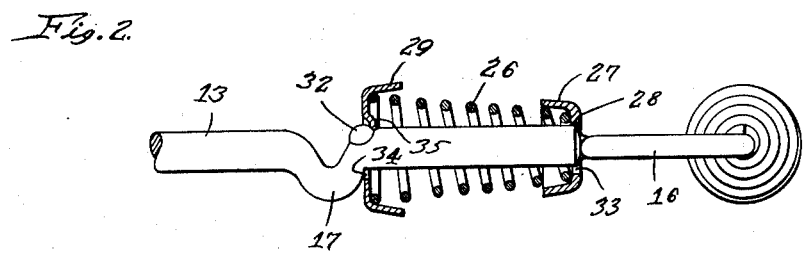
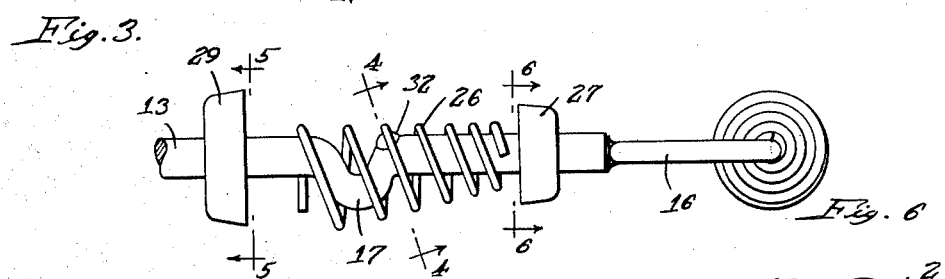
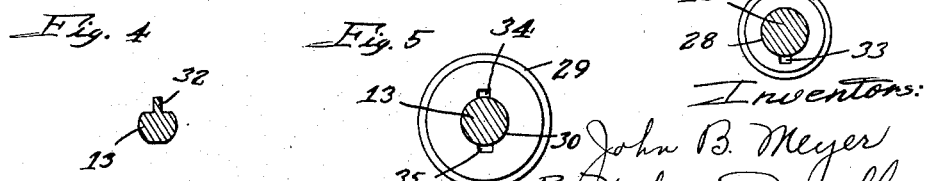

Patented Dec. 5, 1933

1,937,708

UNITED STATES PATENT OFFICE 1,937,708

STOVE PIPE DAMPER

John B. Meyer, Dubuque, Iowa, assignor to The Adams Company, Dubuque, Iowa, a corporation of Iowa Application January 14, 1931. Serial No. 508,575

1 Claim. (Cl. 126—292)

This invention relates to stove pipe dampers. Stove pipe dampers are commonly provided with a spring in connection with the damper stem to hold the shoulder or crank portion on the stem in locked relation with the recess provided therefor in the damper plate. Now, the stem must necessarily be detached from the damper plate when the damper is to be installed, and, frequently too, it is desired to sell the stem together with its tension spring as a separate assembly. In the past, no provision was made for proper retention of the spring on the stem and this meant the likelihood of confusion on the part of the customer in attempting to install the damper; he was apt to get the parts together in the wrong relationship, once the parts got off the stem and had to be replaced. Likewise, the damper stem, spring, and the other parts cooperating therewith, when shipped without a plate, would not reach the customer as a complete assembly ready for installation, and there was always the chance of the customer being confused as to just how the parts went together, and also some likelihood of some necessary part being lost or mislaid. It is, therefore, the principal object of my invention to provide a damper stem which is so constructed that the tensioning spring and the thimbles cooperating with it are always securely retained on the stem and are, nevertheless, easy to assemble on the stem in the first instance.

More specifically stated, my invention contemplates the raising or bumping of a projection on the stem next to the bent portion thereof, which provides the crank for actuating the damper plate, and the provision of notches in the two spring-retaining thimbles alongside the holes in said thimbles through which the stem is arranged to be passed, whereby to permit slipping first the one thimble, then the spring, and then the other thimble over the sharpened end of the stem toward the handle end past the projection, whereupon the second thimble can be turned so as to lock the parts in place with the spring under tension. The projection is on the bent portion of the stem in such location that it does not interfere with the insertion of the stem into the damper plate, which operation involves the compression of the spring a certain amount to bring the crank afforded by the bent portion into the proper position with reference to an opening in the damper plate and then the turning of the stem to enter the crank in said opening, whereupon the spring exerts end pressure on the stem to hold the crank locked in the opening.

The invention is illustrated in the accompanying drawing, in which—

Figure 1 is a horizontal section through a stove pipe showing the complete damper assembly therein;

Fig. 2 is a fragmentary enlarged longitudinal section showing the stem removed from the plate, the stem itself appearing in side elevation, but the thimbles and spring in section to better illustrate the construction;

Fig. 3 is a view somewhat similar to Fig. 2 but entirely in side elevation and indicating the way in which the parts are assembled on the stem, and Figs. 4, 5 and 6 are sections taken on the correspondingly numbered lines of Fig. 3.

The same reference numerals are applied to corresponding parts throughout the views.

Referring for the present to Figure 1, the numeral 10 designates an ordinary stove pipe pierced at diametrically opposite sides, as indicated at 11 and 12, to accommodate the damper stem 13 on which the damper plate 14 is mounted. It is, of course, common practice to have the one end of the stem 13 sharpened, as appears at 15, and to provide a handle 16 at the other end. It is likewise common practice to have the stem bent approximately in the form of a V at one point, as at 17, to provide a shoulder or crank portion on the stem by means of which the plate may be turned with the stem. As is well known, the stem finds bearing in bosses 18—20 projecting one way from the plane of the plate, and in other intermediate bosses 21 and 22 projecting the opposite way from the plane of the plate, and the crank 17 is arranged to enter a slot 23 provided in the end boss 24, projecting from the plane of the plate in the same direction as the bosses 21 and 22. An opening 25 is formed in the plate between the bosses 20 and 24 into which the slot 23 opens, and the stem 13 is arranged to be moved endwise against the tension of a spring 26 far enough to bring the crank 17 into position in line with the opening 25 so that the stem can be turned to bring the crank 17 in position to enter the slot, whereupon the crank is entered in the slot by outward movement of the stem, and the spring exerts pressure endwise on the stem to keep the crank locked therein. The construction thus far generally described is well known, and I shall now refer more particularly to Figs. 2-6 in describing the improvements added to said construction in accordance with my invention.

According to my invention, the spring 26, for placing the stem 13 under tension to keep the crank 17 locked in the slot 23, is a compression spring, preferably, though not necessarily, tapered so as to be smaller at its outer end, for neater appearance. The spring bears at its outer end in a thimble 27 which in turn finds abutment on the handle 16 and is, of course, provided with a center hole 28 to receive the stem 13. The inner end of the spring bears in another thimble 29 which in turn has abutment with the outside of the stove pipe 10 about the hole 11. The thimble 29 likewise has a center hole 30 to accommodate the stem 13. The boss 24 on the plate 14 has a shoulder 31 thereon bearing against the inside of the pipe 10 around the hole 11. Obviously, the shoulder 31 is urged in one direction toward engagement with the inside of the pipe 10, and the thimble 29 is urged in the opposite direction toward engagement with the outside of the pipe under the action of the spring 26. Now, it will be seen that if no provision were made to hold the parts 26, 27 and 29 on the stem when the stem is removed from the plate, there would be no assurance of the parts staying on the stem, and if they got off that they would be assembled again on the stem in the proper relationship, and, furthermore, such a construction, which would rely upon the plate being assembled on the stem to hold the parts in place thereon, would practically necessitate the selling of the complete damper assembly, whereas it may be, and frequently is desired to sell either the stem assembly or the plate separately. Considering that even with a complete damper assembly one has to remove the stem from the plate in the installation of the damper, and there is, consequently, danger of the spring and thimbles coming off the stem and being possibly lost or mislaid, and at any rate, causing confusion to the customer as to just how to replace them on the stem, it is evident that it is a decided advantage to have some provision for retaining the spring and its related parts on the stem. That relieves the customer of any bother in connection with this part of the damper assembly when installing the damper. The advantage of having the stem together with its spring and the thimbles made up in a unitary assembly is of greater significance when it is considered that it facilitates matters when this portion of the complete damper assembly is handled separately. For example, in the shipment of such unitary assemblies, there is no danger of the spring or either one of the thimbles being lost, and the stem reaches the customer ready for insertion in the stove pipe, there being no loose parts for the customer to handle and possibly get assembled in the wrong relationship. The retention of the parts on the stem is accomplished, in accordance with my invention, by simply raising or bumping a projection 32 on the stem preferably at the bend forming the crank 17. This projection is in the form of a narrow, elongated lug disposed in the longitudinal plane of the stem, as is thought to be evident from the drawing, and notches 33 and 34 are provided in the thimbles 27 and 29, respectively, alongside the holes 28 and 30, just large enough to permit the thimbles to pass the projection as they are slipped over the stem. The three parts 26, 27 and 29 are, of course, all assembled on the stem over the sharpened end toward the handle end, the thimble 27 first, followed by the spring 26 and thimble 29, as appears in Fig. 3. It requires some slight compression of the spring 26 to bring the thimble 29 past the projection 32, and then the thimble is arranged to be turned to bring the notch 34 out of register with the projection so as to lock the parts in assembled position on the stem. I prefer to provide a depressed portion 35 suitably diametrically opposite the notch 34 on the thimble 29, immediately alongside the hole 30 therein, so that turning of the thimble can be prevented by simply entering the projection 32 in this depressed portion. In that way, there is no danger of the thimble 29 turning and possibly turning enough to bring the notch 34 into register with the projection 32, which would leave the parts free to slip off the stem, at least the thimble 29 and spring 26, if not the thimble 27 also.

In operation, it is evident from a study of Fig. 2 that the stem 13 removed from the damper plate 14 has the spring 26 and thimbles 27 and 29 held thereon as a part of a unitary assembly. This makes it feasible and thoroughly practical to handle the stems with springs and thimbles assembled thereon separately instead of relying upon the damper plates to keep the assemblies intact. Figure 1 illustrates the fact that when the stem is inserted into the damper plate in the installation of a damper, the spring 26 is compressed beyond what is the case in Fig. 2, in order to interlock the crank 17 with the damper plate in the manner above described. Thus, the projection 32 is moved away from the thimble 29 and the full pressure of the spring 26 is made available to hold the stem in its assembled position.

I claim:

In a device of the class described, a stem having a handle at one end thereof and having a lug projecting therefrom at a distance from the handle, a washer-like member engageable on the stem having a center hole provided therein to receive the stem and having a notch provided therein opening off the hole whereby to permit movement of the member along the stem toward the handle and past the lug when the notch is in alignment with the lug, said member having a recess provided therein alongside the hole but in circumferentially spaced relation to the aforesaid notch and arranged to receive said lug when the member is turned from alignment of the notch with the lug to alignment of the recess with the lug, and a spring on said stem between the handle and the member normally tending to urge the member away from the handle, whereby to keep the recessed portion of the member yieldingly in engagement with the lug.

JOHN B. MEYER.